US008230478B2

(12) United States Patent
Bennett et al.

(10) Patent No.: US 8,230,478 B2
(45) Date of Patent: Jul. 24, 2012

(54) FLEXIBLY ASSIGNING SECURITY CONFIGURATIONS TO APPLICATIONS

(75) Inventors: Paul W. Bennett, Austin, TX (US); Elisa Ferracane, Austin, TX (US); Daniel E. Morris, Austin, TX (US); Michael C. Thompson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 421 days.

(21) Appl. No.: 12/548,767

(22) Filed: Aug. 27, 2009

(65) Prior Publication Data

US 2011/0055926 A1    Mar. 3, 2011

(51) Int. Cl.
*H04L 9/00* (2006.01)
*H04L 9/32* (2006.01)

(52) U.S. Cl. ............ 726/1; 726/4; 726/26; 726/27
(58) Field of Classification Search .......... 726/1–6, 726/26–30; 713/1, 164–167
See application file for complete search history.

(56) References Cited

U.S. PATENT DOCUMENTS

| | | | |
|---|---|---|---|
| 5,434,562 A | 7/1995 | Reardon | |
| 6,243,815 B1 | 6/2001 | Antur et al. | |
| 6,487,665 B1 | 11/2002 | Andrews et al. | |
| 7,089,584 B1 * | 8/2006 | Sharma | 726/4 |
| 7,171,685 B2 | 1/2007 | Batra et al. | |
| 7,373,654 B1 | 5/2008 | Reid | |
| 2005/0102534 A1 | 5/2005 | Wong | |
| 2005/0120122 A1 | 6/2005 | Farnham | |
| 2005/0149612 A1 | 7/2005 | Messinger et al. | |
| 2005/0183084 A1 | 8/2005 | Cuomo et al. | |
| 2005/0198530 A1 | 9/2005 | Chess et al. | |
| 2005/0198691 A1 | 9/2005 | Xiang et al. | |
| 2005/0283604 A1 | 12/2005 | Deshpande et al. | |
| 2006/0021016 A1 | 1/2006 | Birk et al. | |
| 2006/0294041 A1 | 12/2006 | Baartman | |
| 2008/0141336 A1 | 6/2008 | Haller | |
| 2008/0168528 A1 | 7/2008 | Lin et al. | |
| 2008/0189711 A1 | 8/2008 | Cavage et al. | |
| 2008/0281861 A1 | 11/2008 | Booz et al. | |
| 2009/0106555 A1 | 4/2009 | Buer | |
| 2010/0262577 A1 * | 10/2010 | Pulfer et al. | 707/608 |

OTHER PUBLICATIONS

Mike Peters. Securing MYSQL on Linux. Linux.com. Aug. 1, 2004.*
Maunder et al; "Designing a 'Universal' Web Application Server"; ACM Digital Library; pp. 86-94; 2005.
Hafiz et al; "Security-Oriented Program Transformations [Extended Abstract]" ; ACM Digital Library; Apr. 13-15, 2009.
Wang Yang et al; "Management Architecture and Secure Policy based on Samba Server"; INSPEC/Control Engineering China, vol. 12, No. 1, pp. 57-60, Jan. 2005.
Espacenet search, Espacenet Result Luist, Jan. 2012.

* cited by examiner

*Primary Examiner* — Hosuk Song
(74) *Attorney, Agent, or Firm* — Garg Law Firm, PLLC; Rakesh Garg; Jeffrey S. LaBaw

(57) ABSTRACT

A method, system, and computer usable program product for flexibly assigning security configurations to applications are provided in the illustrative embodiments. An embodiment determines, forming a first determination, whether a first identifier identifying the application is mapped to the security configuration. The embodiment determines, forming a second determination, whether the application participates in a group by determining whether a second identifier identifying the group is mapped to the security configuration. The embodiment assigns, forming a first assignment, the security configuration to the application if either of the first and the second determinations is true. The embodiment assigns, forming a second assignment, the security configuration to the application using a determination by a first policy if the first and the second determinations are false.

18 Claims, 9 Drawing Sheets

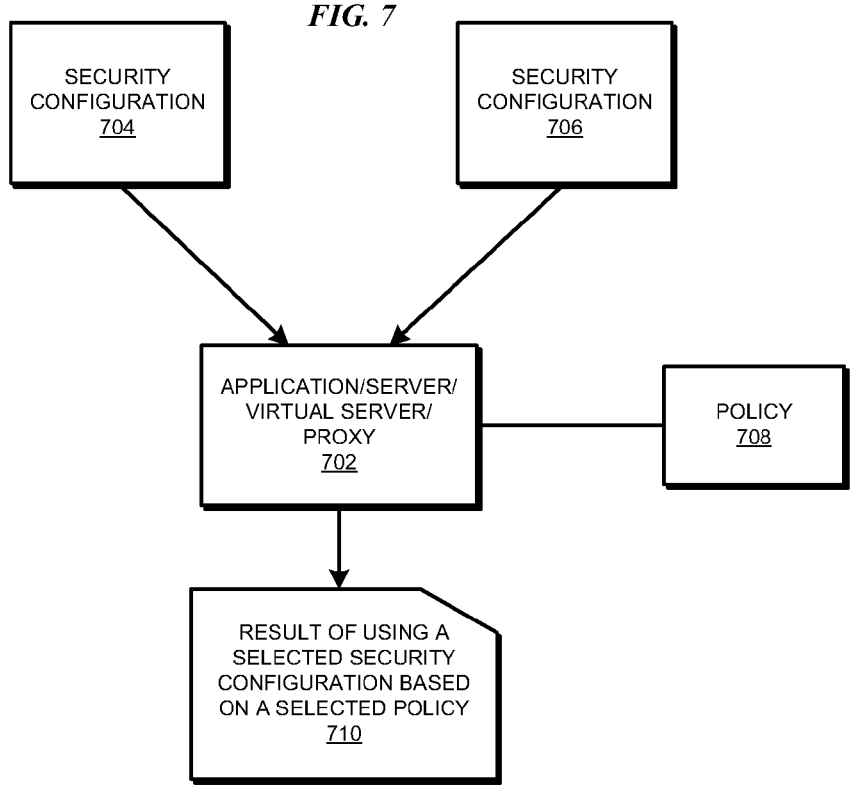
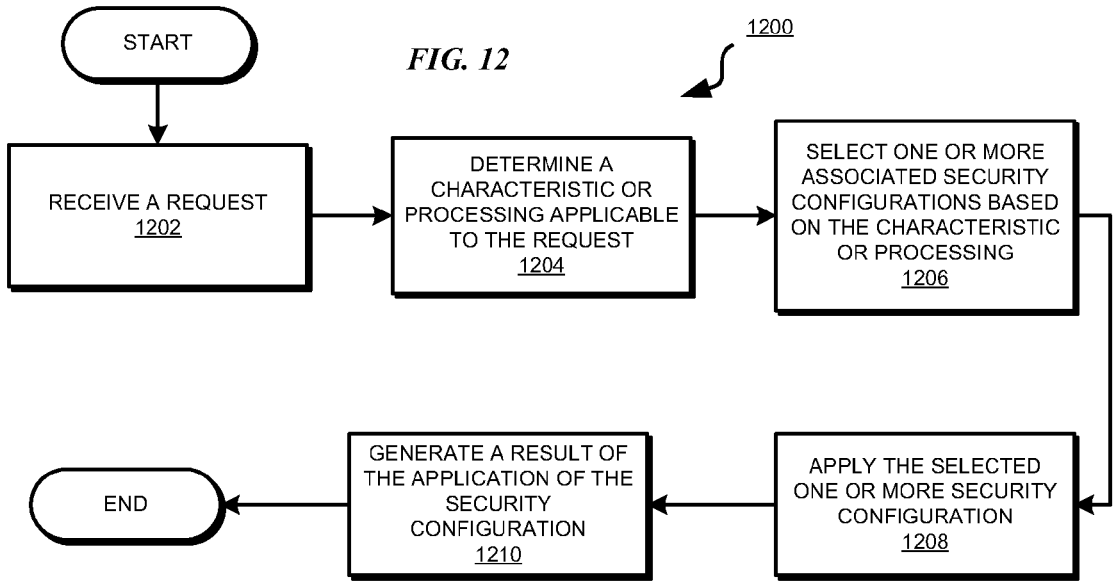

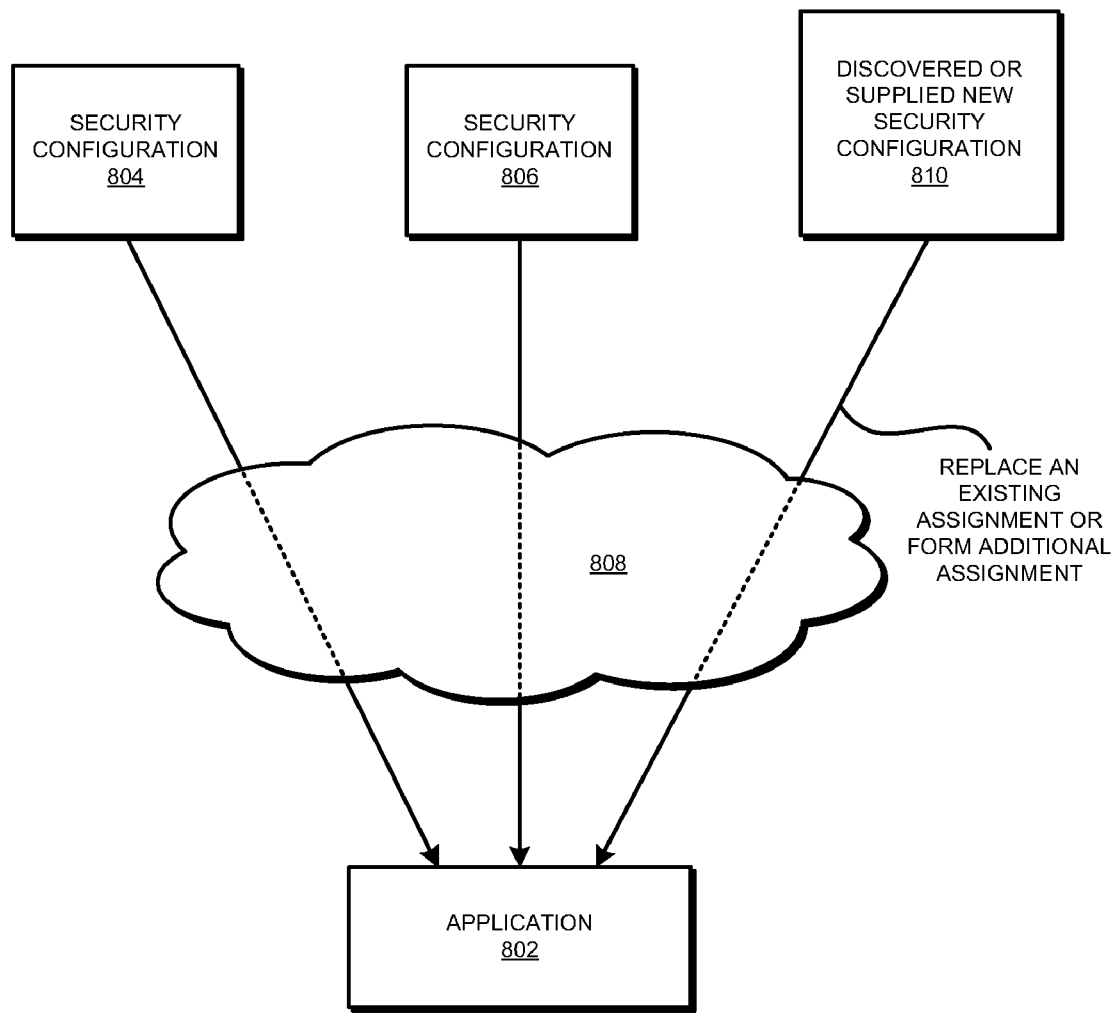

FLEXIBLY ASSIGNING SECURITY CONFIGURATIONS TO APPLICATIONS

BACKGROUND OF THE INVENTION

1. Field of the Invention

The present invention relates generally to an improved data processing system, and in particular, to a computer implemented method for managing security in a data processing environment. Still more particularly, the present invention relates to a computer implemented method, system, and computer usable program code for flexibly assigning security configurations to applications.

2. Description of the Related Art

When systems, applications, and users interact with each other in a data processing environment, maintaining security of access and data becomes an important consideration. For example, a user may attempt to access a file that the user may not be authorized to access. Determining the lack of authorization and preventing access under such circumstances is a security issue that has to be handled by security components of a data processing system.

Often, in making security decisions, security components utilize information that has been configured to resolve security related issues. Frequently, many systems and applications may exist and be operational in a given data processing environment at any given time. Different applications may face security issues different from one another. Consequently, different applications may require different security information to resolve those different security issues.

Furthermore, applications may execute under the control of, depend on the execution of, or relate to behavior of other applications. For example, an application may be served over a network via an application server. An application server is itself an application that executes under the control of another application, such as a web deployment platform that may manage several application servers, web servers, and proxy servers, as well as interfaces to one or more databases, directories, and directory servers.

In a commonly used data processing environment, architectures for serving applications may involve many other related applications and servers. Each of the served application and the other related applications and servers may manage a part of the overall security of data processing environment.

For example, a platform application may manage the security issues surrounding interfacing with other servers and communicating with data processing environments. An application server or a web server may handle the security issues surrounding the security of a secured Hypertext Transport Protocol (HTTPS) during a session. The application being served to a browser or another system may handle the security issues regarding manipulation of data in certain files.

SUMMARY OF THE INVENTION

The illustrative embodiments provide a method, system, and computer usable program product for flexibly assigning security configurations to applications. According to the invention, an embodiment determines, forming a first determination, whether a first identifier identifying the application is mapped to the security configuration. The application executes in a data processing system. The embodiment determines, forming a second determination, whether the application participates in a group by determining whether a second identifier identifying the group is mapped to the security configuration. The embodiment assigns, forming a first assignment, the security configuration to the application if either of the first and the second determinations is true. The data of the first assignment is recorded in a data storage associated with the data processing system. The embodiment assigns, forming a second assignment, the security configuration to the application using a determination by a first policy if the first and the second determinations are false. The data of the second assignment is recorded in the data storage associated with the data processing system.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

FIG. 7 depicts a block diagram of selectively applying a security configuration from several assigned security configurations in accordance with an illustrative embodiment;

FIG. 8 depicts a block diagram of changing assignment of security configurations in accordance with an illustrative embodiment;

FIG. 12 depicts a flowchart of a process of selecting and applying a security configuration to a data transaction in accordance with an illustrative embodiment.

DETAILED DESCRIPTION OF THE PREFERRED EMBODIMENT

Figure 1:
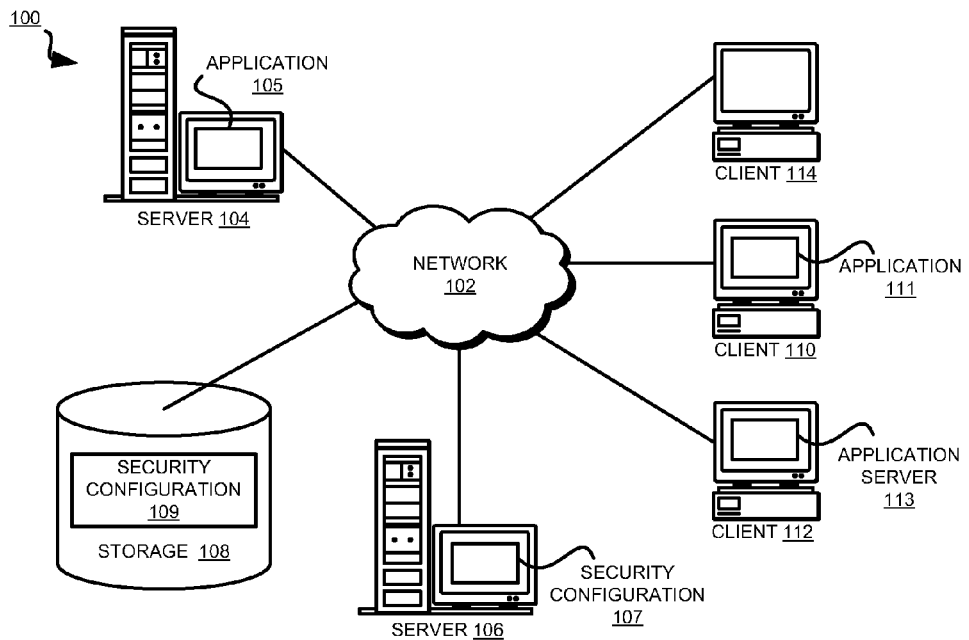
FIG. 1 depicts a pictorial representation of a network of data processing systems in which illustrative embodiments may be implemented.

A security component is a hardware, software, or firmware in a data processing system that participates in managing security of data processing system's resources. A resource of a data processing system may be a hardware, software, or firmware component of the data processing system, or data accessible from the data processing system.

A security configuration is a collection of information usable in resolving security issues arising during execution of application in a data processing system. For example, when an entity accesses an application the entity is typically asked to provide an ID and a password to authenticate the entity's identity. The ID and password is authenticated against a set of known IDs and passwords, known as a user registry. The application may request access to a certain resource, for example, a file or a component of a data processing system, on behalf of the entity. Whether to grant the entity access to the requested resource is a security question that is resolved by referring to a set of authorization rules, known as an authorization policy. Whether the entity is authorized to access the requested resource is a piece of information that is usable in resolving the security question. A security issue is a security problem or concern. A security issue gives rise to a security question.

Similarly, many other security questions may arise during interactions between systems, applications, and users. As another example, which method of authentication to use to authenticate an application requesting access to particular data is also information that can be included in a security configuration. As another example, which certificate database or key store to use for validating a certificate being presented during a secured session is a security issue. Information to resolve these types of security issues can also be included in a security configuration.

The invention recognizes that presently a single common security profile has to be assigned to all instances of applications executing under an installation of a platform application. A platform application is an application that enables executing several instances of one or more types of server applications under a single installation of the platform application. IBM® WebSphere® is one example of a platform application. (IBM and WebSphere are registered trademarks of International Business Machines Corporation in the United States and several other countries). Many other similar platform applications are available from a variety of software manufacturers.

The invention recognizes that in the presently available technology, instances of server application in one installation of a platform application can only be assigned, or associated with, a single security configuration. The invention further recognizes that presently, applications executing under an instance of a server application also have to be assigned the same security configuration as assigned to the server application.

This limitation of presently available technology forces an installation of a platform application and applications executing there under to use a single security configuration. One presently used work-around to overcome this limitation is to make the single security configuration include every security information any application executing under the platform application may ever need. The invention recognizes that this work-around makes the security configuration over-inclusive, and a single point of failure for the entire installation.

Another presently used work-around to overcome this limitation is to install the platform application numerous times. An installation is then associated with a different security configuration. Applications using one security configuration are executed under one installation, and applications using a different security configuration are executed under a different platform installation.

The invention recognizes that this presently used work-around causes numerous parallel installations and executions of large platform applications, which increases the load on the data processing environment significantly. Additionally, multiple licenses for platform applications have to be acquired at non-trivial cost to enable several installations.

The invention further recognizes that presently, even with the work-around techniques, once a security configuration is assigned to a server instance or an application there under, the assignment is of a permanent nature. In other words, presently, once a security configuration is assigned to an application, including to an instance of a server application, that assignment cannot be changed without significant disruption in service. For example, the application, the server, or the entire platform may have to be shut down to assign a different security configuration.

The illustrative embodiments used to describe the invention generally address and solve the above-described problems and other problems related to assigning security configurations to applications. The illustrative embodiments provide a method, computer usable program product, and data processing system for flexibly assigning security configurations to applications.

The illustrative embodiments are described with respect to applications, which include the applications that are served, the instances of any type of server application, a platform application, a stand-alone application, as described above, or a combination thereof. Furthermore, the application of the illustrative embodiments may include data, data source, or access to a data source over a data network.

Application may further include data objects, code objects, encapsulated instructions, application fragments, services, and other types of resources available in a data processing environment. For example, Java® object, an Enterprise Java Bean (EJB®), a servlet, or an applet may be manifestations of an application with respect to which the invention may be implemented. (Java, EJB, and other Java related terminologies are registered trademarks of Sun Microsystems, Inc. in the United States and other countries.)

Additionally, an application of the illustrative embodiments may be implemented in hardware, software, or a combination thereof. For example, a hardware or firmware component of a data processing system may be a resource to which security configurations may apply. Such hardware or firmware components are also applications within the scope of the invention and the invention can be practiced with respect to such applications as well. Some examples of such an application are a network adapter card, I/O controllers, disk drives, processors, routers, and switches.

The illustrative embodiments further describe ways of assigning more than one security configurations to an application. According to an illustrative embodiment, once a security configuration is assigned to an application, the assignment can be changed, the assigned security configuration can be modified, new assignments can be added, and old assignments can be replaced. Furthermore, these manipulations of assignments can be performed in any combination.

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

For example, the above-described example security issues or example information that can be included in a security configuration are described only as examples. These issues and information are not intended to be limiting on the invention. An embodiment of the invention may include other information in a security configuration that may be usable for resolving other security issues within the scope of the invention.

The illustrative embodiments are described using specific code, data structures, designs, architectures, layouts, schematics, and tools only as examples and are not limiting on the illustrative embodiments. Furthermore, the illustrative embodiments are described in some instances using particular software tools and data processing environments only as an example for the clarity of the description. The illustrative embodiments may be used in conjunction with other comparable or similarly purposed systems, applications, or architectures. For example, some illustrative embodiments that are described in conjunction with an application server can be used in conjunction with a virtual server, a proxy server, or another type of server application within the scope of the illustrative embodiment.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
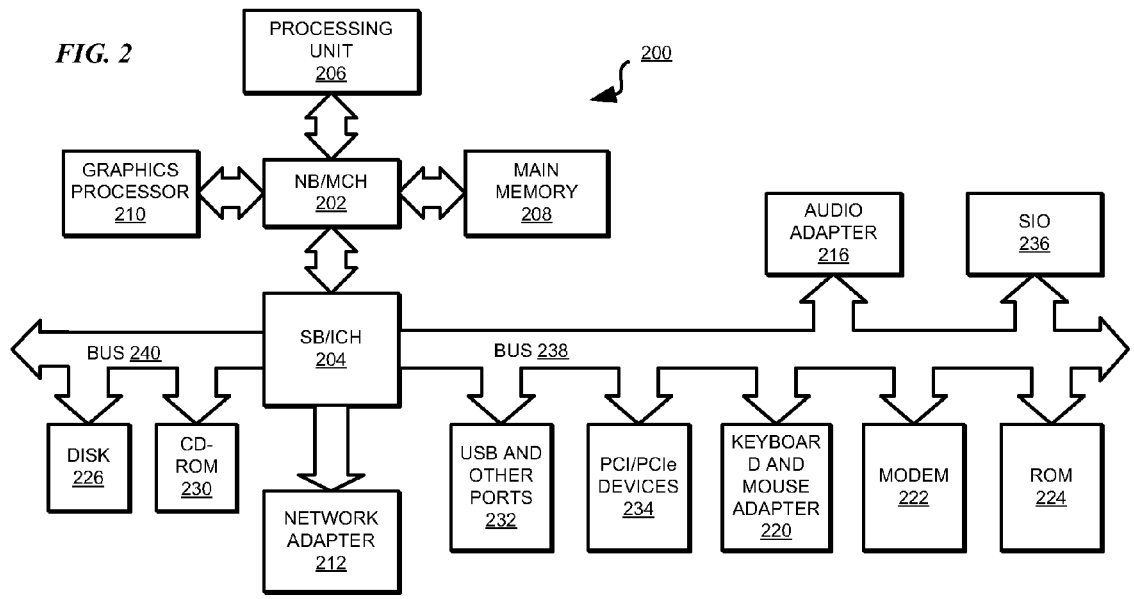
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon. For example, server 104 may include application 105. Application 105 may be a server application or an application being served via a server application. Server 106 may include security configuration 107. Storage 108 may also include one or more security configurations, such as security configuration 109. Client 110 may include application 111. Client 112 may include a server application or an instance thereof, such as application server 113. As an example, application server 113, using security configuration 107, may server application 111.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
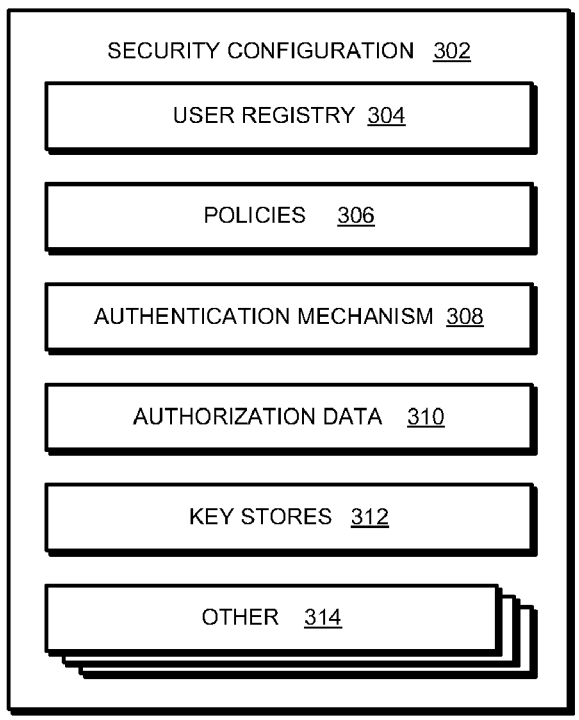
FIG. 3 depicts a block diagram of a security configuration in accordance with an illustrative embodiment.

With reference to FIG. 3, this figure depicts a block diagram of a security configuration in accordance with an illustrative embodiment. Security information 302 may be implemented as security information 107 or 109 in FIG. 1.

Security configuration 302 is shown to include certain security information only as an example. Additional, different, or a modified form of the shown security information will be apparent from this disclosure and the same is contemplated as a part of the invention.

Security information 302 includes information about user registry 304, which may be used to authenticate user-information. Note that user-information may include information about systems and applications that may act as users of other applications.

Security information 302 further includes policies 306. Policies 306 may themselves be a set of rules, or a set of references to a set of rules located elsewhere on a data network. A set of rules is one or more rules. A set of references is one or more references. A rule or policy includes instructions that determine how to perform a certain security function. For example, a policy may be that a user authentication may not persist for more than five minutes in a session with no activity. As another example, a policy may be that a certain certificate when presented for a HTTPS connection must be validated using a certain key store. Another example policy may specify that during an authenticated session, an authorized user may only read certain data but not modify that data.

These example policies or rules are described here only for clarity of the description and are not intended to be limiting on the illustrative embodiments. Any number of policies can be created to perform any conceivable type of action according to the requirements of a particular implementation. Such policies are contemplated within the scope of the illustrative embodiments.

Authentication mechanism 308 may be a type of algorithm, a specific algorithm, a particular code, or a reference there to, that may be used to authenticate certain information. For example, in one embodiment, authentication mechanism 308 may specify, such as in a policy, whether certain credentials presented in one process may be forwarded to another process. In another example embodiment, authentication mechanism 308 may describe a type of authentication to use under certain circumstances. Some examples of types of authentication may be local authentication with the information configured within the operating system of a data processing system, authentication using lightweight directory access protocol (LDAP), or authentication using a custom registry. Note that authentication mechanism 308 may be separately specified in security configuration 302, or may be included as a policy in policies 306.

Authorization data 310 may be any data or a reference there to, that is usable for determining authorization for performing certain actions. In one embodiment, authorization data 310 may be a hierarchy of information used for authorizing an action. In another embodiment, authorization data 310 may be a set of permissions applicable to certain actions for determining whether a system has those permissions to be authorized to perform those actions.

In another example embodiment, authorization data 310 may be a set of commands, which when executed either perform certain authorized actions or determine whether a system is authorized to perform certain actions. Of course, an implementation may use a combination of these and other types of authorization data 310 without departing the scope of the invention.

Key stores 312 may be references to one or more databases where keys, certificates, or other cryptographic information may be stored. A key store in key stores 312 may be referenced for performing a security function, such as validating a certificate. A key store referenced by key stores 312 may be accessible to a process using security configuration 302 over a data network.

Other information 314 may be a collection of many other types of security information usable in particular implementations of the invention. Other information 314 may be the information itself or a reference to the information accessible over a data network. Generally, any information included in security configuration 302 may be data or a reference to the data accessible over a data network.

Figure 4:
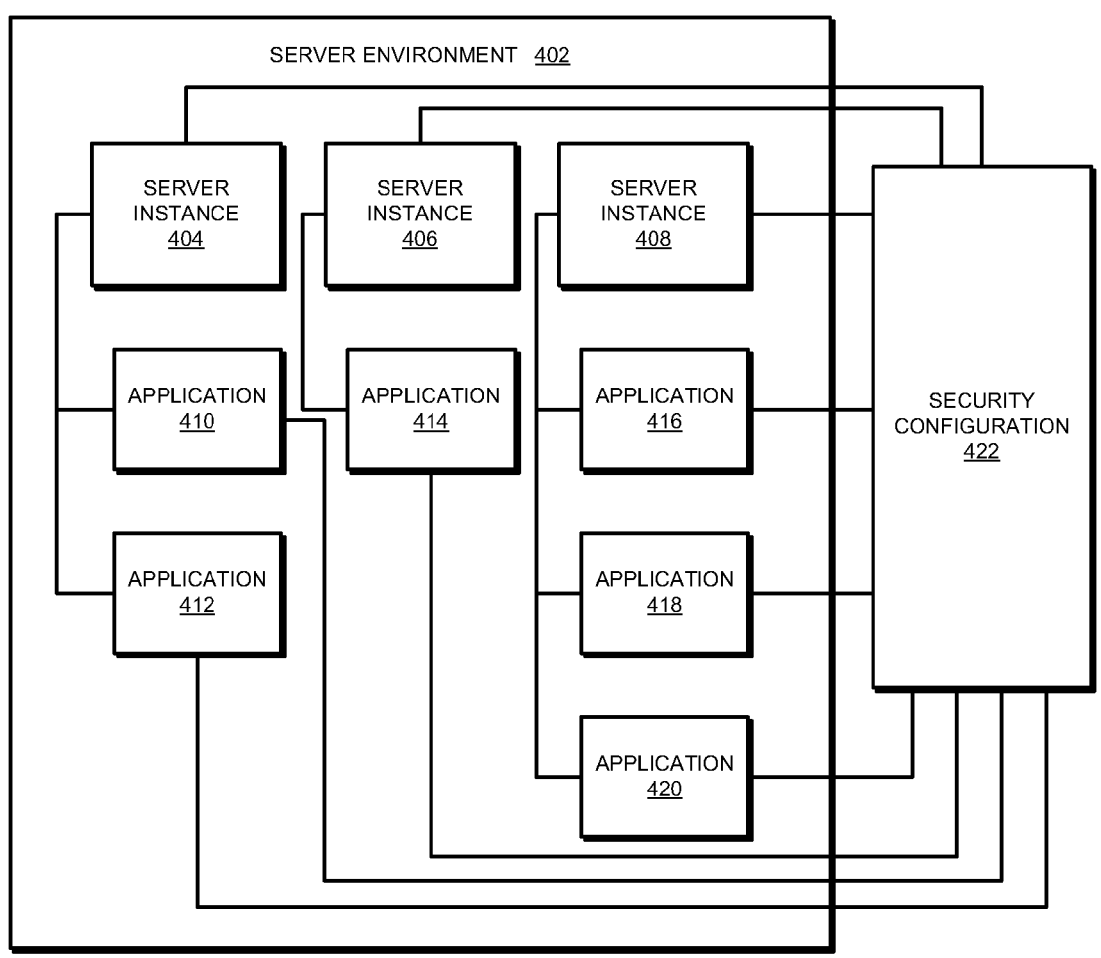
FIG. 4 depicts a block diagram of a security configuration assignment where an illustrative embodiment may be implemented.

With reference to FIG. 4, this figure depicts a block diagram of a security configuration assignment configuration where an illustrative embodiment may be implemented. Server environment 402 may be a data processing environment where one or more server applications or instances thereof may be executed. As an example, in one embodiment, a platform application may function as server environment 402. In another example embodiment, a server, such as server 104 in FIG. 1, may act as server environment 402, application 104 in FIG. 1 being one of the server applications in server environment.

Server instances 404, 406, and 408 may be instances of same or different server applications capable of executing under server environment 402. Only as an illustrative example configuration, server instance 404 may serve applications 410 and 412, server instance 406 may serve application 414, and server instance 408 may serve applications 416, 418, and 420.

Applications 410, 412, 414, 416, 418, and 420 may be instances of same or different applications in any combination. A particular server instance may serve any application, any number of applications, and other data in any combination without limitation.

Security configuration 422 is associated with each server instance and applications that use security configurations. Presently, as shown in this figure, a common security configuration has to be assigned to each of server instances 404, 406, and 408 in server environment 402. Furthermore, each application executing under those server instances, that uses security configurations, is also assigned the same security configuration—security configuration 422—that is assigned to the corresponding server instance.

Illustrative embodiments recognize that such an assignment is undesirable. As the illustrative embodiments recognize, this assignment method lacks the flexibility of associating different security configurations with different server instances and applications.

This assignment method also lacks the flexibility of changing the assigned security configuration to one component, such as an application, without disrupting another component, such as a server instance or another application. This assignment method also lacks the flexibility of assigning multiple security configurations to an application, such as to a server instance or an application executing under the server instance.

Figure 5:
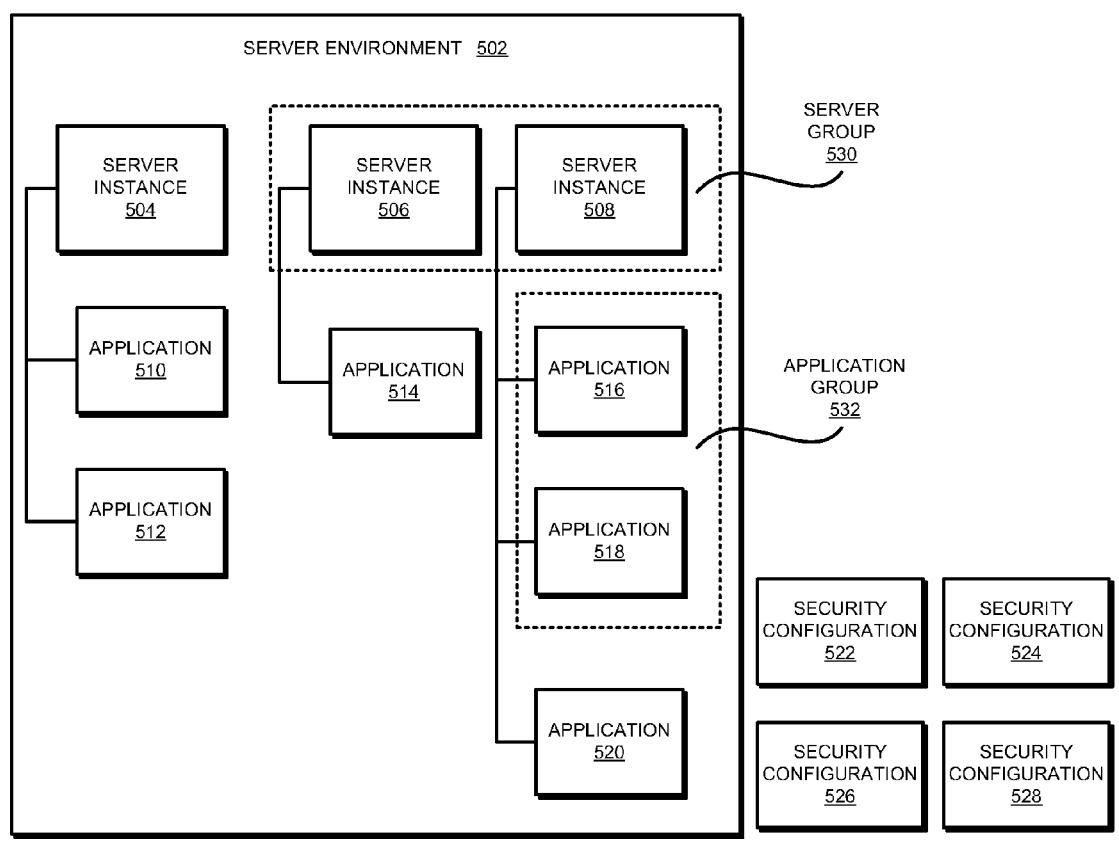
FIG. 5 depicts a block diagram of applications and security configurations in accordance with an illustrative embodiment.

With reference to FIG. 5, this figure depicts a block diagram of applications and security configurations in accordance with an illustrative embodiment. Server environment 502 may be implemented using server environment 402 in FIG. 4.

Server environment 502 may include one or more server instances, for example, server instances 504, 506, and 508. A server instance, such as any of server instances 504, 506, and 508, may be implemented using any of server instances 404, 406, and 408 in FIG. 4. Applications 510 and 512 may execute under and be served by server instance 504. Application 514 may execute under and be served by server instance 506. Applications 516, 518, and 520 may execute under and be served by server instance 508.

In accordance with an illustrative embodiment, more than one security configurations may be available for associating with server instances and applications in a given data processing environment. Security configurations 522, 524, 526, and 528 represent security configurations that are configured differently from one another in some respect. For example, security configuration 522 may differ from security configuration 524 in the authentication mechanism used.

As another example, security configuration 524 may differ from security configuration 526 in the key stores used or the policies employed. As another example, security configuration 526 may differ from security configuration 528 in that security configuration 526 may be modifiable whereas security configuration 528 may be static once defined. Any number of security configurations may exist in an implementation of the invention and such security configurations may differ from one another in any respect without limitation.

Further in accordance with an illustrative embodiment, server instances may be grouped together to form server groups. Server group 530 is an example server group including server instances 506 and 508. Actual server instance processes, virtual servers, and references to servers, such as from a proxy server, may also be grouped into server groups in a similar manner.

Applications executing under a server instances may also be grouped into application groups. Application group 532 is an example application group including applications 516 and 518 executing under server instance 508. Where a server instance serves not applications but other types of data, data may be grouped into data groups in a manner similar to application group 532.

Figure 6:
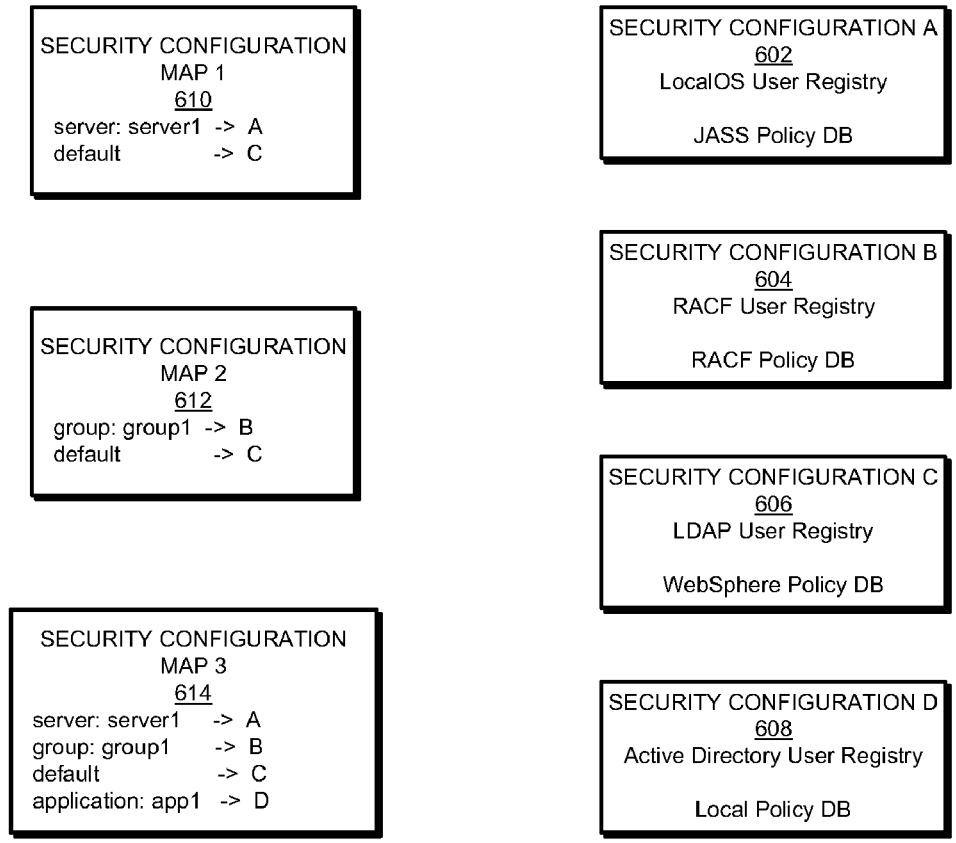
FIG. 6 depicts a block diagram of mapping security configurations in accordance with an illustrative embodiment.

With reference to FIG. 6, this figure depicts a block diagram of mapping security configurations in accordance with an illustrative embodiment. Mapping security configurations is flexibly assigning a security configuration to a server instance, server group, application, application group, data, or data group. Furthermore, mapping a security configuration to, for example a server instance, is a flexible assignment in that the mapping can be changed at any time.

As an example to illustrate the mapping operation, security configuration A, 602, security configuration B, 604, security configuration C, 606, and security configuration D, 608 are simplified security configurations with only a few security information components shown therein. The specific type of security information shown in security configurations 602, 604, 606, and 608, such as JASS policy DB or LDAP user registry, are used only as examples and are not limiting on the invention.

In a data processing environment according to the invention, the served applications, application groups, served data sources, data groups, server applications and their instances, server groups, and other entities are identified by identifiers that are unique within the data processing environment. Maps 610, 612, and 614 are example mappings of security configurations 602, 604, 606, and 608 to example servers, server groups, and applications.

Map 610, namely, security configuration map 1, shows as an example that a server instance with the identifier "server1" is mapped to security configuration A, 602. As an example, server instance 504 in FIG. 5 may have the identifier "server1". Accordingly, server instance 504 in FIG. 5 may be mapped to security configuration 602.

A security configuration may be designated as a default security configuration. A default security configuration is a security configuration that is mapped to an application or data when no specific security configurations are to be assigned to the application or data. For example, according to map 610, server instances whose identifiers do not match identifier "server1" are mapped to default security configuration C, 606.

Map 612 depicts a different mapping as compared to map 610. Map 612, namely, security configuration map 2, shows as an example, that a server group with the identifier "group1" is mapped to security configuration B, 604. As an example, server group 530 in FIG. 5 may have the identifier "group1". As shown in FIG. 5, server instances 504 and 506 participate in server group 530. Accordingly, any of server instances 504 and 506 in FIG. 5 may be mapped to security configuration 604. Again, for example, according to map 612, server instances that do not participate in group with group identifier "group1" are mapped to default security configuration C, 606.

Thus, by operation of both maps 610 and 612 in a data processing environment, as an example, server instance 504 in FIG. 5 is mapped to security configuration A, 602, and server instances 504 and 506 in FIG. 5 are mapped to security configuration B, 604. Had, for example, server instance 504 not participated in server group 530 in FIG. 5, server instance 504 in FIG. 5 would be assigned to default security configuration C, 606.

Map 614 depicts a different mapping as compared to maps 610 or 612. Map 614, namely, security configuration map 3, shows as an example that a server with the identifier "server1" is mapped to security configuration A, 602. A server group with the identifier "group1" is mapped to security configuration B, 604.

An application with the identifier "app1" is mapped to security configuration D, 608. For example, application 514 in FIG. 5 may have the identifier "app1". Accordingly, application 514 in FIG. 5 will be mapped to security configuration 608 even though server instance 504 participates in server group "group1". Again, for example, according to map 612, applications that do not have identifiers "server1" or "app1", and that do not participate in group with group identifier "group1" are mapped to default security configuration C, 606.

Notice that a specific mapping takes precedence over a derivative mapping. A specific mapping is a mapping of a server instance, application, or a data source having a specified identifier to a specific security configuration. A derivative mapping is a mapping of a server instance, application, or a data source, whose identifier is not specified, to a specific security configuration based on the groups or server instances in which they participate or operate.

As an example, according to map 614, application 514 in FIG. 5 maps to security configuration D, 608. However, if application 510 in FIG. 5 had an identifier "app2", which is not specified in map 614, application 510 in FIG. 5 would be mapped to security configuration A, 602, because that application executes under server with identifier "server1".

As another example, assume that application 516 in FIG. 5 had an identifier "app3", which is not specified in map 614. Application 516 in FIG. 5 would be mapped to security configuration B, 604, because that application executes under server instance 506, which participates in server group with identifier "group1".

As another example, assume that application 518 in FIG. 5 had an identifier "app4", which is not specified in any map. However, a map (not shown) may specify a mapping for an application group 532 in FIG. 5, having identifier "appgroup1", to security configuration A, 602. Application 518 in FIG. 5 would be mapped to security configuration A, 602, because that application executes under application group 532 in FIG. 5 that has the identifier "appgroup1".

Notice that a map may provide several alternative derivative mappings. For example, for an application, different mappings of the application group identifier, the server group identifier, and the server instance identifier may be available.

Any suitable order of preference of mapping can be established in a given data processing environment within the scope of the invention. For example, one implementation of the invention may prefer an application group identifier mapping to a server group identifier mapping for an application.

Another implementation of the invention may prefer a server instance identifier mapping to a server group identifier mapping for an application. Many other variations of the preferences will be apparent from this disclosure and the same are contemplated within the scope of the invention.

A map according to the invention may include as many mapping as desired in a given data processing environment. For example, a map may include specific mapping of a set of server instance identifiers, a set of server group identifiers, a set of data source identifiers, a set of data group identifiers, a set of application identifiers, and a set of application group identifiers in any combination.

A set of server instance identifiers is one or more server instance identifiers. A set of server group identifiers is one or more server group identifiers. A set of data source identifiers is one or more data source identifiers. A set of data group identifiers is one or more data group identifiers. A set of application identifiers is one or more application identifiers. A set of application group identifiers is one or more application group identifiers.

Furthermore, a map according to the invention may include a set of default mappings. A set of default mappings is one or more default mappings. For example, one default mapping may be based on a server identifier not matching specified server identifiers. Another default mapping may be based on a server group identifier not matching specified server group identifiers.

Another default mapping may be based on an application identifier not matching specified application identifiers. Another default mapping may be based on an application group identifier not matching specified application group identifiers. Another default mapping may be based on a data source identifier not matching specified data source identifiers.

Another default mapping may be based on a data group identifier not matching specified data group identifiers. Generally, a mapping in a map according to the invention may map any type of identifier used in a data processing environment to a security configuration map.

With reference to FIG. 7, this figure depicts a block diagram of selectively applying a security configuration from several assigned security configurations in accordance with an illustrative embodiment. Application 702 may be a served application, such as application 514 in FIG. 5, an instance of a server application, such as server instance 504 in FIG. 5, a virtual server, a proxy server application, or any other type of server application.

Security configurations 704 and 706 are assigned to application 702, such as by using mapping similar to that described in FIG. 6. Security configurations 704 and 706 may each be implemented using any of security configurations 522, 524, 526, or 528 in FIG. 5. Security configurations 704 and 706 may be different from one another in some respect depending on the specific implementation.

Two security configurations are shown assigned to application 702 only as an example and are not intended to be limiting on the invention. Any number of security configurations may be similarly assigned to application 702 within the scope of the invention.

Policy 708 may be a policy for selecting a security configuration from a set of security configurations assigned to application 702. For a given transaction, such as request to access certain data or application, or a request to manipulate certain data or application, policy 708 may define how to select a security configuration from security configurations 704 and 706. Result 710 may be produced from application 702 having selected a security configuration based on policy 708. More than one policy 708 may be available to application 702 for making the selection.

As an example, policy 708 may specify that when a request to access an application originates from a LAN, security configuration 704 should be applied. Policy 708 in this example may further specify that security configuration 706 should be used for request from WAN. Of course, any aspect of a given data transaction occurring at application 702 may be used in implementing policy 708 without limitation on the invention. An implementation may use factors other than aspects of the data transaction, such as time of day or system load, to select security configurations in policy 708 without departing the scope of the invention.

Result 710 may be produced from application 702 based on selecting a security configuration using policy 708. More than one policy 708 may be available to application 702 for making the selection. Selecting one of many policies 708 may itself be determined by a policy.

With reference to FIG. 8, this figure depicts a block diagram of changing assignment of security configurations in accordance with an illustrative embodiment. Application 802 may be implemented using application 702 in FIG. 7.

Security configurations 804 and 806 may be two example security configurations assigned to application 802, such as by using a mapping as described in FIG. 6. Furthermore, zero or more security configurations may be accessible over data network 808 and may be assigned to application 802 such that application 802 accesses those security configurations over data network 808.

During operation, application 802 may discover a new security configuration that may become available in a data processing environment. Alternatively, during operation, application 802 may be supplied a new security configuration. Security configuration 810 may be such a supplied or discovered new security configuration. Whether security configuration 810 should be mapped to application 802 may be determined by a policy, such as policy 708 in FIG. 7.

Furthermore, whether assigning security configuration 810 to application 802 replaces an existing assignment or becomes an additional assignment may also be determined by using a policy. For example, in one embodiment, assigning security configuration 810 to application 802 may result in dropping an existing assignment, such as the assignment of security configuration 804, keeping the total number of mapped security configuration to two in the depicted example. In another example embodiment, assigning security configuration 810 to application 802 may result in adding a new assignment to the existing two assignments, bringing the total number of mapped security configurations to three in the depicted example.

Figure 9:
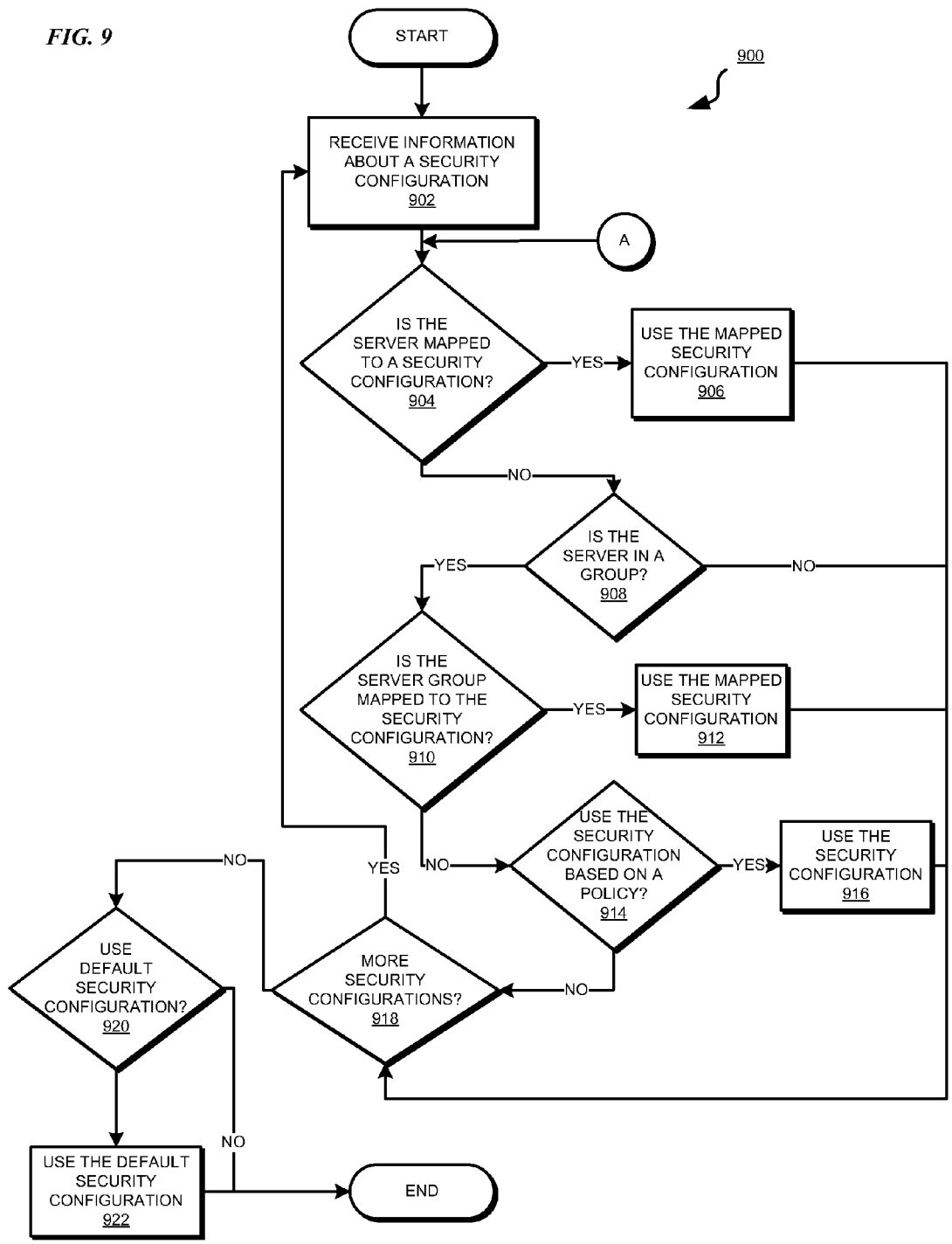
FIG. 9 depicts a flowchart of a process of assigning a security configuration in accordance with an illustrative embodiment.

With reference to FIG. 9, this figure depicts a flowchart of a process of assigning a security configuration in accordance with an illustrative embodiment. Process 900 may be implemented in a platform application, a server environment, such as server environment 502 in FIG. 5, or an administrative application, such as application 105 in FIG. 1.

Process 900 begins by receiving information about a security configuration at the start of a server application instance or during the execution of a server application instance (step 902). Process 900 determines whether a server application instance is mapped to the security configuration (step 904). If the server application instance is mapped to the security configuration ("Yes" path of step 904), process 900 uses the security configuration as mapped to the server application (step 906).

If the server application instance is not mapped to the security configuration ("No" path of step 904), process 900 determines whether the server instance participates in a server group (step 908). If the server instance participates in a server group ("Yes" path of step 908), process 900 determines whether the server group is mapped to the security configuration of step 902 (step 910). If the server group is mapped to the security configuration ("Yes" path of step 910), process 900 uses the security configuration as mapped to the server group with the server application instances not having specific mappings under the server group (step 912).

If the server group is not mapped to the security configuration ("No" path of step 910), process 900 determines whether to use the security configuration based on a policy (step 914). If the security configuration should be used ("Yes" path of step 914), process 900 uses the security configuration according to the policy (step 916).

If process 900 determines that the security configuration should not be used ("No" path of step 914), process 900 determines whether more security configurations exist for examination in a similar manner (step 918). If more security configurations exist ("Yes" path of step 918), process 900 returns to step 902.

If no more security configurations exist ("No" path of step 918), process 900 determines whether a default security configuration should be assigned (step 920). If a default security configuration should be assigned ("Yes" path of step 920), process 900 uses a default security configuration (step 922). Process 900 ends thereafter. If a default security configuration should not be assigned ("No" path of step 920), process 900 ends thereafter as well.

Following the use of security configuration of step 902 in steps 906, 912, and 916, process 900 proceeds to step 918 as well. Process 900 also proceeds to step 918 if the server application instance does not participate in a server group ("No" path of step 908).

Figure 10:
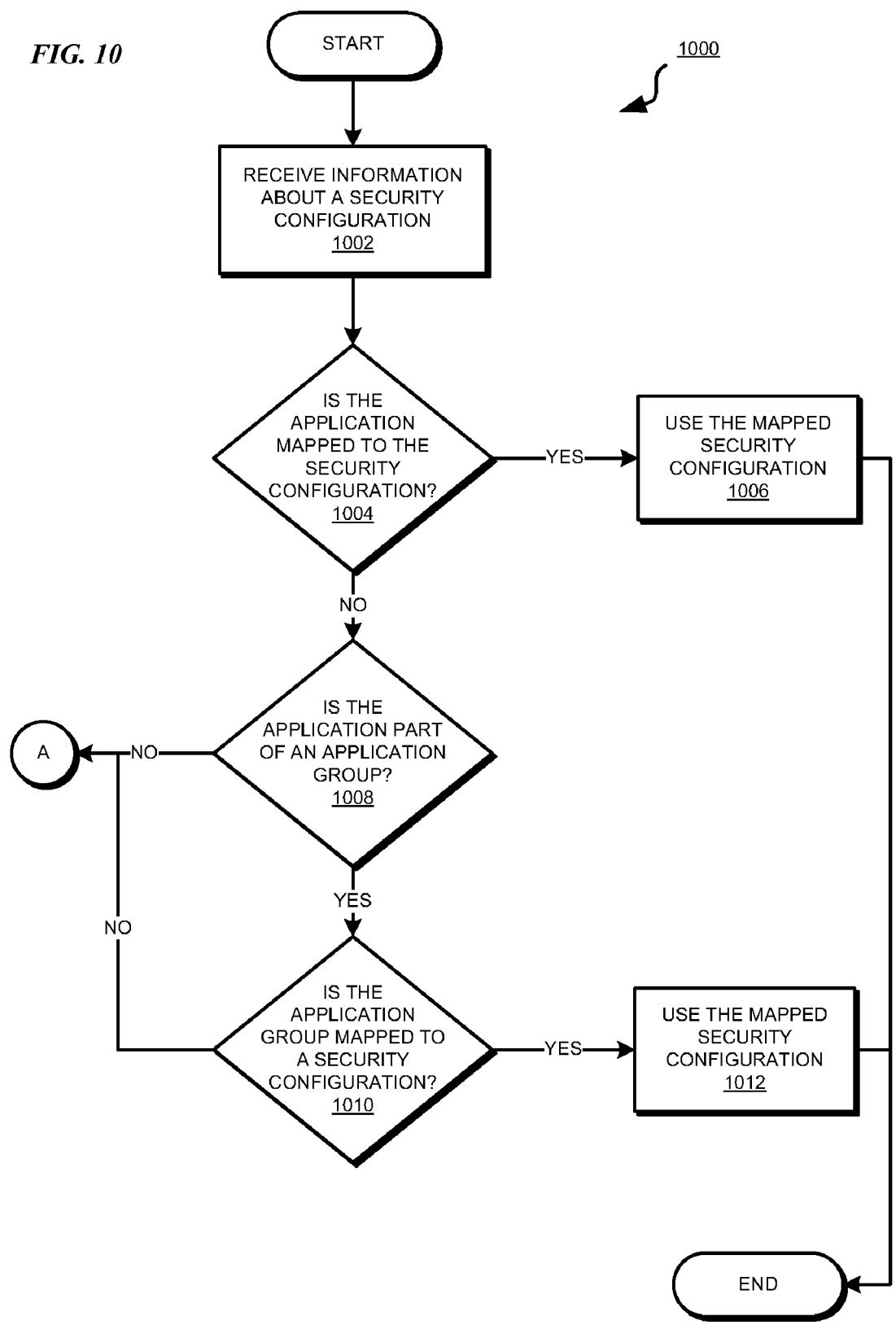
FIG. 10 depicts a flowchart of a process of assigning a security configuration to a served application or data in accordance with an illustrative embodiment.

With reference to FIG. 10, this figure depicts a flowchart of a process of assigning a security configuration to a served application or data in accordance with an illustrative embodiment. Process 1000 may be implemented in a platform application, a server environment, such as server environment 502 in FIG. 5, or an administrative application, such as application 105 in FIG. 1.

Process 1000 begins by receiving information about a security configuration at the start of an application or during the execution of an application (step 1002). Process 1000 determines whether an application is mapped to the security configuration (step 1004). If the application is mapped to the security configuration ("Yes" path of step 1004), process 1000 uses the security configuration as mapped to the application (step 1006).

If the server application is not mapped to the security configuration ("No" path of step 1004), process 1000 determines whether the application participates in an application group (step 1008). In one embodiment, process 1000 may omit step 1008 if process 1000 follows the "Yes" path of step 1004. In another embodiment, process 1000 may execute step 1008 regardless of which patch of step 1004 process 1000 follows.

If the application participates in an application group ("Yes" path of step 1008), process 1000 determines whether the application group is mapped to the security configuration of step 1002 (step 1010). If the application group is mapped to the security configuration ("Yes" path of step 1010), process 1000 uses the security configuration as mapped to the application group with the applications not having specific mappings under the application group (step 1012). Process 1000 ends thereafter.

If the application group is not mapped to the security configuration ("No" path of step 1010), process 1000 proceeds to step 904 in process 900 in FIG. 9. If the application is not a part of an application group ("No" path of step 1008), process 1000 proceeds to step 904 in process 900 in FIG. 9 as well.

Figure 11:
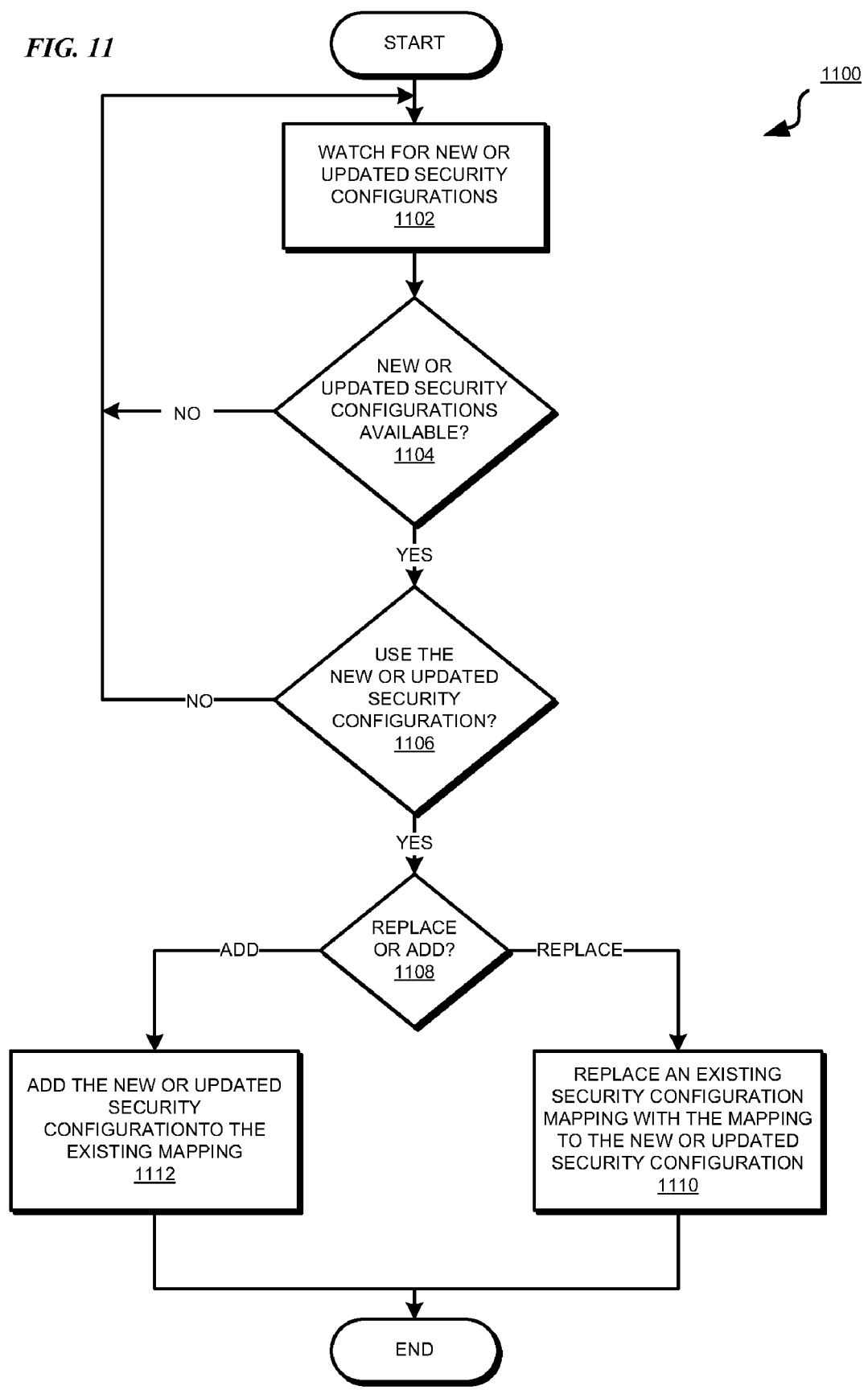
FIG. 11 depicts a flowchart of a process of flexibly manipulating assignments of security configurations to applications in accordance with an illustrative embodiment.

With reference to FIG. 11, this figure depicts a flowchart of a process of flexibly manipulating assignments of security configurations to applications in accordance with an illustrative embodiment. Process 1100 may be implemented in a platform application, a server environment, such as server environment 502 in FIG. 5, or an administrative application, such as application 105 in FIG. 1. Process 1100 may also be implemented in a server application or a served application.

Process 1100 begins by watching for new or updated security configurations (step 1102).

Process 1100 determines whether any new or updated security configurations are available in the data processing environment (step 1104). Process 1100 may actively discover or be supplied new security configurations in step 1104. If no new or updated security configuration is available ("No" path of step 1104), process 1100 returns to step 1102.

If any new or updated security configuration is available ("Yes" path of step 1104), process 1100 determines, such as by using a policy, whether the new or updated security configuration should be used (step 1106). If the new or updated security configuration should not be used ("No" path of step 1106), process 1100 returns to step 1102.

If the new or updated security configuration can be used ("Yes" path of step 1106), process 1100 determines whether a new mapping to the new or updated security configuration should be added or the mapping to the new or updated security configuration should replace an existing mapping (step 1108). If process 1100 decides to replace a new mapping ("replace" path of step 1108), process 1100 replaces an existing security configuration mapping with the mapping to the new or updated security configuration (step 1110). Process 1100 ends thereafter. The selection of the existing mapping to replace can be accomplished using a policy.

If process 1100 determines that a new mapping should be added ("Add" path of step 1108), process 1100 adds a new mapping to the new or updated security configuration (step 1112). Process 1100 ends thereafter.

Policies can be configured in accordance with the invention to accomplish any decisional task. For example, the determination steps such as those in processes 900 in FIG. 9, 1000 in FIG. 10, and 1100 in FIG. 11 can be made by suitably configuring one or more policies.

With reference to FIG. 12, this figure depicts a flowchart of a process of selecting and applying a security configuration to a data transaction in accordance with an illustrative embodiment. Process 1200 may be implemented in an application, such as a server application, a virtual server, a proxy server, or a served application. For example, process 1200 may be implemented in server instance 504 or application 514 in FIG. 5.

Process 1200 begins by receiving a request (step 1202). The request of step 1202 may be a request to manipulate data or an application, instruction to perform an operation, command to execute a function, or a combination thereof.

Process 1200 determines a characteristic of the request or a processing applicable to the request (step 1204). For example, a characteristic of the request may be the one or more permission associated with the originator of the request. A parameter of the request, such as a certificate or key accompanying the request may also be a characteristic of the request. State of certain data related to the request may also be a characteristic of the request. Examples of processing applicable to the request may include authorizing, authenticating, transforming, translating, parsing, storing-and-forwarding, bifurcating, challenging, copying, redirecting, or logging the request.

These examples of characteristics of the request or processing applicable to the request are listed only for clarity of the description and are not intended to be limiting on the scope of the invention. Many other characteristics and processing related to requests will be apparent from this disclosure and the same are contemplated within the scope of the invention. Determining the characteristic or processing may also be accomplished by suitably configuring a policy.

Process 1200 selects one or more security configurations associated with or mapped to the application where process 1200 may be executing (step 1204). The selection of step 1204 is based on the characteristic or processing associated with the request. The selection of one or more security configurations in step 1206 may be performed using a policy.

Process 1200 applies the selected one or more security configurations to the request (step 1208). Process 1200 generates a result of the application to the selected one or more security configurations to the request (step 1210). Process 1200 ends thereafter.

The components in the block diagrams and the steps in the flowcharts described above are described only as examples. The components and the steps have been selected for the clarity of the description and are not limiting on the illustrative embodiments of the invention. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the invention.

Thus, a computer implemented method, apparatus, and computer program product are provided in the illustrative embodiments for flexibly assigning security configurations to applications. Using the embodiments of the invention, a data processing environment can associate different security configurations with servers, server groups, applications, application groups, data sources, and data groups.

Furthermore, using certain embodiments of the invention, a data processing environment can manipulate the mappings or associations between security configurations and application or data without causing a significant deterioration of service. New or updated security configurations can be discovered or supplies to executing applications. New or replacement mappings can be formed using the new or updated security configurations at a more granular level than is currently possible.

Using the invention, a data processing environment may be able to map more than one security configuration to certain applications. The more than one security configurations may participate in a conditions-based selection, or may act in combination under certain circumstances.

The invention can take the form of an entirely software embodiment, or an embodiment containing both hardware and software elements. In a preferred embodiment, the invention is implemented in software or program code, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for assigning a security configuration to an application, the computer implemented method comprising:
    determining, forming a first determination, whether a first identifier identifying the application is mapped to the security configuration, the application executing in a data processing system using a processor and a memory;
    determining, forming a second determination, whether the application participates in a group by determining whether a second identifier identifying the group is mapped to the security configuration;
    creating a set of maps, a map in the set of maps including a combination of (i) mapping of an application identifier to a first security configuration from a plurality of security configurations, (ii) mapping of a group identifier to a second security configuration in the plurality of security configurations, and (iii) default mapping to a third security configuration in the plurality of security configurations;
    using a map from the plurality of maps in making the first and the second determinations, the security configuration being a member of the plurality of security configurations;
    assigning, forming a first assignment, the security configuration to the application responsive to either of the first and the second determinations being true, data of the first assignment being recorded in a data storage associated with the data processing system; and
    assigning, forming a second assignment, the security configuration to the application using a determination by a first policy responsive to the first and the second determinations being false, data of the second assignment being recorded in the data storage associated with the data processing system.

2. The computer implemented method of claim 1, wherein the application is an instance of a server application and the group is a server group, wherein the first determination is a determination of a specific mapping and the second determination is a determination of a derivative mapping.

3. The computer implemented method of claim 2, wherein the specific mapping takes precedence over the derivative mapping.

4. The computer implemented method of claim 1, wherein the application is one of (i) a served application, (ii) a data source, and (iii) a resource, the computer implemented method further comprising:
    determining, forming a third determination, whether a third identifier identifying a server instance associated with the application is mapped to the security configuration;
    determining, if the server instance participates in a server group, forming a fourth determination, whether a fourth identifier identifying the server group is mapped to the security configuration; and
    assigning the security configuration to the application if either of the first, second, third, and fourth determinations is true.

5. The computer implemented method of claim 4, further comprising:
    assigning the security configuration to the application using a determination by a second policy if the first, second, third, and fourth determinations are false.

6. The computer implemented method of claim 4, further comprising:
    assigning, using a third policy, a second security configuration instead of the security configuration to the application according to a default mapping even if one of the first, second, third, and fourth determination is true.

7. The computer implemented method of claim 1, further comprising:
    identifying one of a characteristic and a processing associated with a request received at the application;
    selecting, using the one of the characteristic and the processing, a security configuration from a plurality of security configurations associated with the application; and
    generating a result by applying the selected security configuration to the request.

8. A computer usable program product comprising a computer usable storage device including computer usable code for assigning a security configuration to an application, the computer usable program product comprising:

computer usable code for determining, forming a first determination, whether a first identifier identifying the application is mapped to the security configuration, the application executing in a data processing system;

computer usable code for creating a set of maps, a map in the set of maps including a combination of (i) mapping of an application identifier to a first security configuration from a plurality of security configurations, (ii) mapping of a group identifier to a second security configuration in the plurality of security configurations, and (iii) default mapping to a third security configuration in the plurality of security configurations;

computer usable code for using a map from the plurality of maps in making the first and the second determinations, the security configuration being a member of the plurality of security configurations;

computer usable code for assigning, forming a first assignment, the security configuration to the application when the first determination is true, data of the first assignment being recorded in a data storage associated with the data processing system; and computer usable code for assigning, forming a second assignment, the security configuration to the application using a determination by a first policy when the first determination is false, data of the second assignment being recorded in the data storage associated with the data processing system.

9. The computer usable program product of claim 8, wherein the application is an instance of a server application and the group is a server group, wherein the first determination is a determination of a specific mapping and the second determination is a determination of a derivative mapping.

10. The computer usable program product of claim 9, wherein the specific mapping takes precedence over the derivative mapping.

11. The computer usable program product of claim 8, wherein the application is one of (i) a served application, (ii) a data source, and (iii) a resource, the computer usable program product further comprising:

computer usable code for determining, forming a third determination, whether a third identifier identifying a server instance associated with the application is mapped to the security configuration;

computer usable code for determining, if the server instance participates in a server group, forming a fourth determination, whether a fourth identifier identifying the server group is mapped to the security configuration; and computer usable code for assigning the security configuration to the application if either of the first, second, third, and fourth determinations is true.

12. The computer usable program product of claim 11, further comprising:

computer usable code for assigning the security configuration to the application using a determination by a second policy if the first, second, third, and fourth determinations are false.

13. The computer usable program product of claim 11, further comprising:

computer usable code for assigning, using a third policy, a second security configuration instead of the security configuration to the application according to a default mapping even if one of the first, second, third, and fourth determination is true.

14. The computer usable program product of claim 8, further comprising:

computer usable code for identifying one of a characteristic and a processing associated with a request received at the application;

computer usable code for selecting, using the one of the characteristic and the processing, a security configuration from a plurality of security configurations associated with the application; and computer usable code for generating a result by applying the selected security configuration to the request.

15. The computer usable program product of claim 8, further comprising:

computer usable code for determining, forming a second determination, whether the application participates in a group by determining whether a second identifier identifying the group is mapped to the security configuration, wherein the first assignment assigns the security configuration to the application if either of the first and the second determinations is true, and wherein the second assignment assigns the security configuration to the application using a determination by a first policy if the first and the second determinations are false.

16. The computer usable program product of claim 8, wherein the computer usable code is stored in a computer readable storage medium in a data processing system, and wherein the computer usable code is transferred over a network from a remote data processing system.

17. The computer usable program product of claim 8, wherein the computer usable code is stored in a computer readable storage medium in a server data processing system, and wherein the computer usable code is downloaded over a network to a remote data processing system for use in a computer readable storage medium associated with the remote data processing system.

18. A data processing system for assigning a security configuration to an application, the data processing system comprising:

a storage device including a storage medium, wherein the storage device stores computer usable program code; and a processor, wherein the processor executes the computer usable program code, and wherein the computer usable program code comprises:

computer usable code for determining, forming a first determination, whether a first identifier identifying the application is mapped to the security configuration, the application executing in a data processing system;

computer usable code for determining, forming a second determination, whether the application participates in a group by determining whether a second identifier identifying the group is mapped to the security configuration;

computer usable code for creating a set of maps, a map in the set of maps including a combination of (i) mapping of an application identifier to a first security configuration from a plurality of security configurations, (ii) mapping of a group identifier to a second security configuration in the plurality of security configurations, and (iii) default mapping to a third security configuration in the plurality of security configurations;

computer usable code for using a map from the plurality of maps in making the first and the second determinations, the security configuration being a member of the plurality of security configurations;

computer usable code for assigning, forming a first assignment, the security configuration to the application responsive to either of the first and the second determinations being true, data of the first assignment being recorded in a data storage associated with the data processing system; and computer usable code for assigning, forming a second assignment, the security configuration to the application using a determination by a first policy responsive to the first and the second determinations being false, data of the second assignment being recorded in the data storage associated with the data processing system.

* * * * *